(12) United States Patent
Irazabal et al.

(10) Patent No.: US 11,227,057 B2
(45) Date of Patent: Jan. 18, 2022

(54) MEMBERSHIP ACCESS MANAGEMENT OF A DATABASE

(71) Applicant: International Business Machines Corporation, Armonk, NY (US)

(72) Inventors: Jeronimo Irazabal, Buenos Aires (AR); Andres Garagiola, Buenos Aires (AR); Diego A. Masini, La Plata (AR)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 16/183,828

(22) Filed: Nov. 8, 2018

(65) Prior Publication Data

US 2020/0151350 A1 May 14, 2020

(51) Int. Cl.
*G06F 21/62* (2013.01)
*H04L 9/06* (2006.01)
*G06F 16/23* (2019.01)

(52) U.S. Cl.
CPC .......... *G06F 21/6218* (2013.01); *G06F 16/23* (2019.01); *G06F 16/2308* (2019.01); *H04L 9/0637* (2013.01)

(58) Field of Classification Search
CPC .. G06F 16/23; G06F 16/2308; G06F 21/6218; H04L 9/0637
USPC ....................................................... 713/193
See application file for complete search history.

(56) References Cited

U.S. PATENT DOCUMENTS

| | | | | |
|---|---|---|---|---|
| 10,097,344 B2 * | 10/2018 | Davis | .................... | H04L 9/0643 |
| 10,630,463 B2 * | 4/2020 | Mankovskii | .......... | G06F 21/602 |
| 2005/0141720 A1 * | 6/2005 | Watanabe | ............. | H04L 9/0822 |
| | | | | 380/279 |
| 2008/0013739 A1 * | 1/2008 | Kim | ...................... | H04L 9/0891 |
| | | | | 380/278 |
| 2012/0243683 A1 * | 9/2012 | Oba | ...................... | H04L 9/0836 |
| | | | | 380/255 |
| 2017/0046526 A1 | 2/2017 | Chan et al. | | |
| 2017/0237554 A1 | 8/2017 | Jacobs et al. | | |
| 2017/0366357 A1 | 12/2017 | Pattanaik et al. | | |
| 2018/0039667 A1 | 2/2018 | Pierce et al. | | |
| 2018/0225448 A1 | 8/2018 | Russinovich et al. | | |

(Continued)

FOREIGN PATENT DOCUMENTS

| | | |
|---|---|---|
| CA | 2948229 A1 | 5/2018 |
| CN | 107171829 A | 9/2017 |
| WO | 2017091530 A1 | 6/2017 |

OTHER PUBLICATIONS

Amann et al., "Cryptographically Enforced Permissions for Fully Decentralized File Systems", IEEE Communications Society subject matter experts for publication in the IEEE P2P 2010 proceedings, (Year: 2010).*

(Continued)

*Primary Examiner* — Khalil Naghdali

(57) ABSTRACT

An example operation may include one or more of identifying a new member (M1) to a permissioned database, creating a new group including the new member and one or more previously identified members (MP), modifying a world state of the permissioned database to identify a set of members in the new group with access to the permissioned database, and responsive to the new member (M1) being identified, creating a new entry (TX1) to the permissioned database using an encryption key (K1) associated with the new member (M1).

17 Claims, 15 Drawing Sheets

(56) References Cited

U.S. PATENT DOCUMENTS

2019/0377889 A1* 12/2019 Mertens ............... H04L 9/0825
2021/0176041 A1*  6/2021 Subra Girish ........ H04L 9/3247

OTHER PUBLICATIONS

Paul et al., "IoT based Secure Smart City Architecture Using Blockchain", 2018 IEEE 2nd International Conference, pp. 215-220 (Year: 2018).*
Anonymous, "Identifying Cascading Cloud Failure Root Cause with Block Chaining";IPCOM000253510D'; Apr. 2018.
Cachin,; "Architecture of the Hyperledger blockchain fabric"; In Workshop on Distributed Cryptocurrencies and Consensus Ledgers; Jul. 2016.

* cited by examiner

640

MEMBERSHIP ACCESS MANAGEMENT OF A DATABASE

TECHNICAL FIELD

This application generally relates to membership access management, and more particularly, membership access management of a database.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Conventionally, a centralized database is limited by its ability to manage membership access and to offer certain members access to only information pertaining to their organization and related organizations. As such, what is needed is a solution to overcome these significant drawbacks.

SUMMARY

One example embodiment may provide a system that includes a plurality of member devices and corresponding member profiles identifying previously identified members and one or more new members of a permissioned database, and a computing node configured to perform one or more of identify a new member (M1) to the permissioned database, create a new group including the new member and one or more previously identified members (MP), modify a world state of the permission database to identify a set of members in the new group with access to the permissioned database, and responsive to the new member (M1) being identified, create a new entry (TX1) to the permissioned database using an encryption key (K1) associated with the new member (M1).

Another example embodiment may include a method that includes one or more of identifying a new member (M1) to a permissioned database, creating a new group including the new member and one or more previously identified members (MP), modifying a world state of the permissioned database to identify a set of members in the new group with access to the permissioned database, and responsive to the new member (M1) being identified, creating a new entry (TX1) to the permissioned database using an encryption key (K1) associated with the new member (M1).

Still another example embodiment may include one or more of a non-transitory computer readable storage medium configured to store instructions that when executed cause a processor to perform identifying a new member (M1) to a permissioned database, creating a new group including the new member and one or more previously identified members (MP), modifying a world state of the permissioned database to identify a set of members in the new group with access to the permissioned database, and responsive to the new member (M1) being identified, creating a new entry (TX1) to the permissioned database using an encryption key (K1) associated with the new member (M1).

DETAILED DESCRIPTION

Figure 1A:
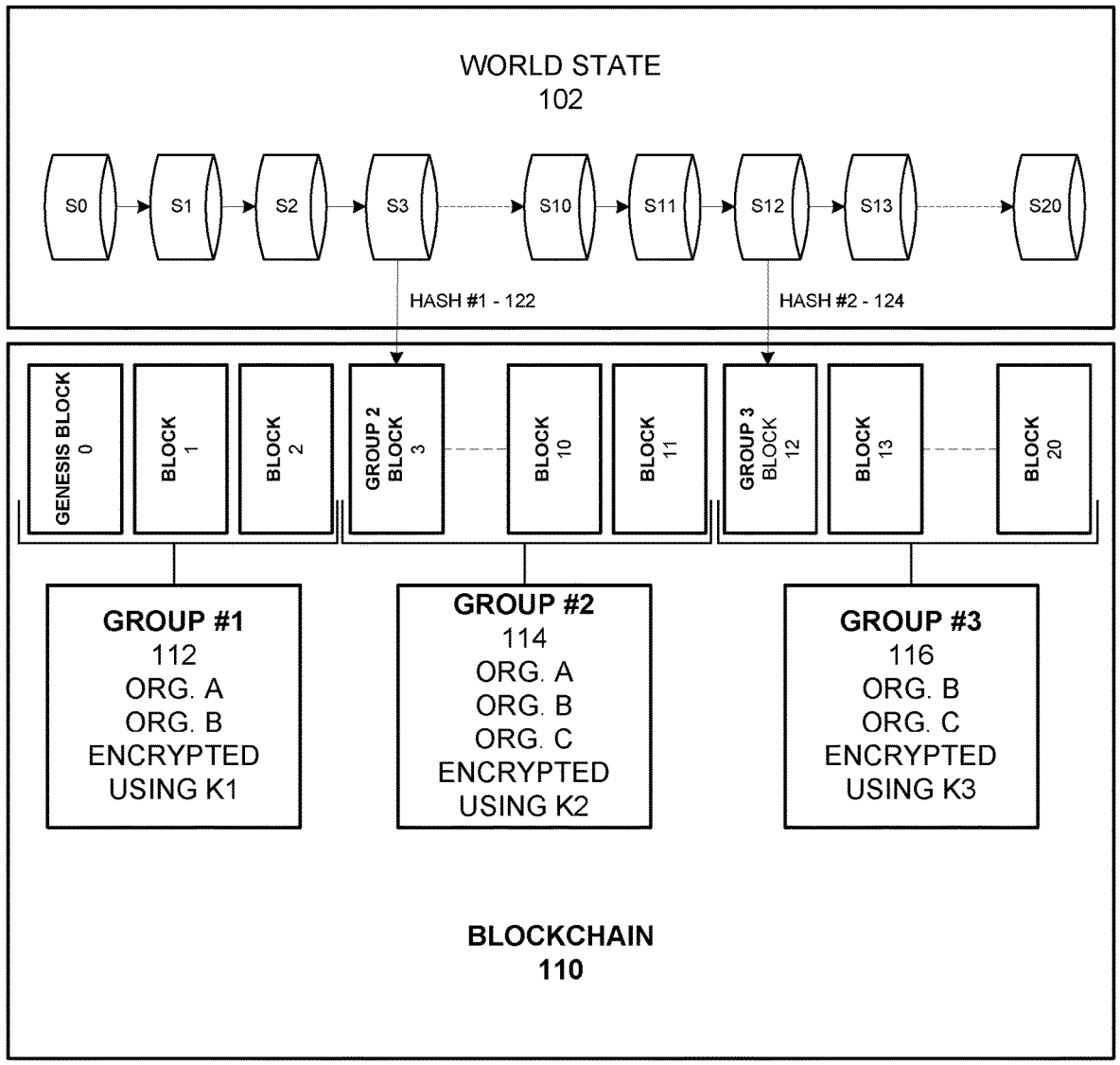
FIG. 1A illustrates a network diagram of a database membership management configuration, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide, for permissioned blockchain implementations, a mechanism to manage organization memberships in the blockchain network. Such a configuration permits a reduced set of organizations to transact in the network at any given time. Some of the blockchain implementations permit adding and removing organizations. The term 'channel' may represent a sub-set of blocks and/or may include a reduced set of all the organizations in the blockchain network, as defined by permissions. For example, if a blockchain has five memberships and only three are communicating via a specific encryption key and the other two membership parties are not intended recipients of those transactions, then the three members may be communicating in a defined channel. In the example embodiments, when a new organization is joined into the blockchain network/channel or ledger, the new organization does not incorporate the capability to see transactions in that ledger from the very beginning of the ledgers' history, and when that organization leaves the ledger membership it should not be able to view and access the transactions still persisted on that channel/blockchain.

According to example embodiments, a level of abstraction called a "view" or "group" will be used to represent a particular set of members/organizations which are currently active in the blockchain at a particular time, the group may be identified by a particular channel being used at any particular time. A blockchain network could implement views/groups independently of a supporting channel, while channels provide the capability to have different sets of organizations in a common blockchain network, the channels also preserve confidentiality at any given time among those specified members by managing different sets of organizations and preserving confidentiality.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain over the blocks. This process forms the ledger by ordering the storage entries, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain entries typically must be "endorsed" before being committed to the blockchain while entries which are not endorsed are disregarded. A typical endorsement policy allows chaincode to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry which normally includes control and setup information.

A ledger is a sequenced, tamper-resistant record of all state transitions of a blockchain. State transitions may result from chaincode invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is an entry log which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Chaincode invocations execute entries against the current state data of the ledger. To make these chaincode interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein.

Example embodiments provide a way to manage dynamic organization membership and preserve confidentiality in a permissioned blockchain implementation. The dynamic membership implementations generally do not preserve confidentiality for new and old transactions as is proposed in the example embodiments. In one example, organizations are only able to see transactions in the ledger while they are part of that blockchain, if the organization leaves the network, then they will not be able to see new transactions after they have left. On the other hand, if the organization joins the network at a particular time, then they will not be able to see old transactions in the ledger prior to their membership. Example embodiments change the way that information is stored in the ledger by creating a new encryption key related to a group of organizations. As a result, all the transactions and data that is processed while the group is active will be encrypted with that new key. This optimizes security in a permissioned blockchain implementation by providing confidentiality to the organizations that operate with the system. The organizations could then be confident about the transactions and data that are being shared in the system and that those transactions will not be accessible in the future by organizations that are were not privileged members of the blockchain at that time.

FIG. 1A illustrates a logic network diagram of identifying and preventing fraud in a database via a blockchain according to example embodiments. Referring to FIG. 1A, the network 100 includes a permissioned database, such as a blockchain 110 with various blocks of blockchain entries along with a parallel set of world states 102 of the blockchain, which are subject to change with each new block and/or group membership that is created. For example, the world state may represent encryption keys and other fundamental blockchain characteristics being used at any given moment in time. In operation, each time that a new organization joins the ledger a new view/group is generated involving previous organizations plus the new one. Each time that an organization leaves the network a new view/group is created removing the leaving organization from the next group. The cryptography used to broadcast transactions in the ledger is based on the current group not a previous group or past members.

As may be observed from FIG. 1A, the first group 112 is based on organizations A and B and includes an encryption key K1. When the membership status changes, a new group block is updated in the blockchain with a new hash 122. The organizations in the second group 114 includes a new member organization C and a new encryption key K2. The encryption key K2 is then used to for all subsequent entries to the blockchain. Such information is stored in a smart contract which is updated when a new group membership occurs. Subsequently, the third group 116 is formed to include organizations B and C using a new encryption key K3. The next hash 124 is used once the next group is formed. The progression of the groups demonstrates that any changes to membership may require new updates to the blockchain entries/blocks, smart contracts and encryption keys used to cipher entries in the database (i.e., blockchain).

Figure 1B:
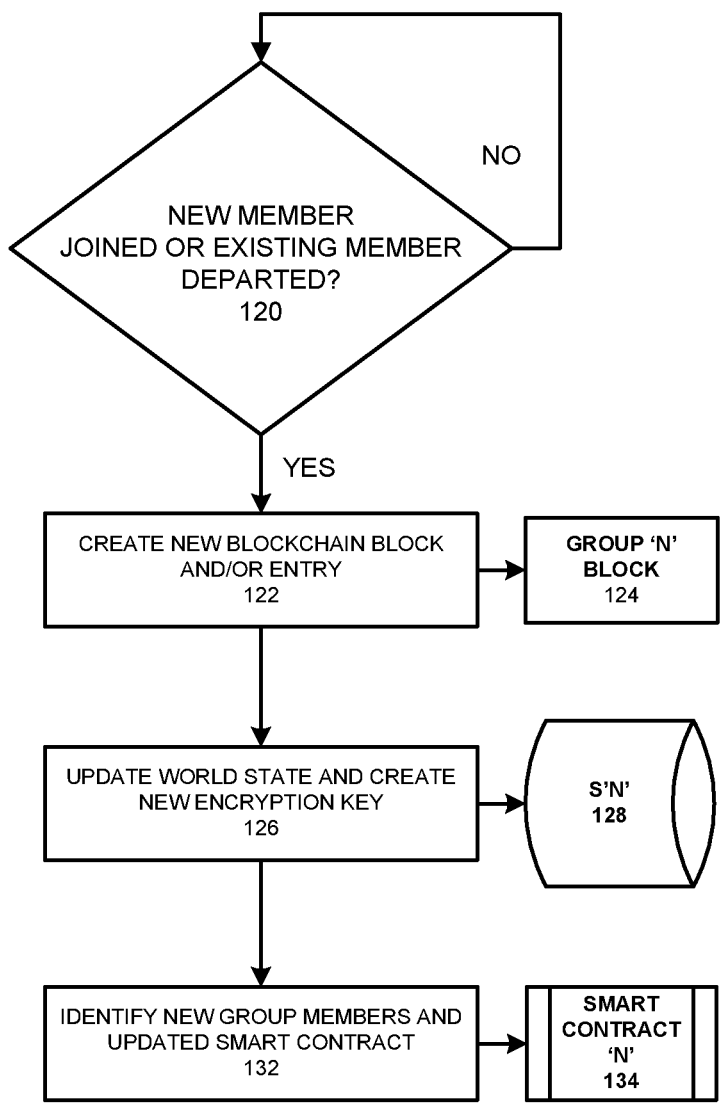
FIG. 1B illustrates a detailed network diagram of a database membership management configuration, according to example embodiments.

FIG. 1B illustrates another example configuration of the blockchain membership management configuration. Referring to FIG. 1B, the process 150 includes determining whether any members are new to the blockchain and are seeking membership and/or whether any members are departing from an existing membership status 120. A new blockchain block entry is performed 122 when the new member is identified and an update may be made as a new group entry to the blockchain 124. The world state 128 is updated with a new key 126 to be used by the group members to sign and submit new entries. The new group members and other information may also be updated 132 in the smart contract 134, which can be accessed and used to apply rules and operations in accordance with members' actions.

In one example of managing the blockchain ledger, the ledger L1 is created into the network. An organization Org1 joins L1, and a view/group V1 is created for L1 involving Org1. When organization Org2 joins L1, a view/group V2 is created for L1 including Org1 and Org2 as members. A member of Org1 may send a transaction TX1. Since TX1 was encrypted using V2's crypto key both organizations Org1 and Org2 are able to observe and access TX1. Next, organization Org3 joins the group, and another view V3 is created for L1 including Org1, Org2 and Org3. Since TX1 was encrypted using V2's key, Org3's members aren't able to access TX1. A member of Org3 may then send a transaction TX3. Since TX3 was encrypted using V3's encryption key, then Org1, Org2 and Org3 are able to see TX3. Then, assuming Org2 leaves L1, a group V4 is created for including Org1 and Org3. Then, when a member of Org1 sends a transaction TX4, since TX3 was encrypted using V4's crypto material Org2's members are not able to view TX4. Groups are created by using a system chaincode defined in a smart contract and during the view creation process, a new block is added to the ledger, which is seen as a genesis block for the joining organization. Since a new organization is not able to reproduce the world state from the very beginning of the ledger creation, the world state is sent to the new organization nodes for at least one of the preexisting organizations' nodes, the hash of the world state is stored in the view block in such a way that new nodes are able to verify the received state by comparing the hash against the hash stored in that block.

To create a new group, a policy has to be fulfilled, this policy sets the condition under which a new view/group could be created. For example, all current organizations have to agree in the view/group modification, or in another example, one only organization determines if the view/group could be modified. Depending on the blockchain implementation, this policy could be sent as a parameter in the system chaincode (SC) invocation, for example, this invocation could receive an additional parameter which is a proof that the policy is being fulfilled. When a new group is created, the SC reads the current view and updates the entry in the world state for the current view. If more than one group is being created in parallel, only the first will be created, additional view modifications will be invalidated and have to be sent again for approval.

When a new view/group is created, a new encryption key is created, which is distributed to the members of the new group in an off-blockchain manner. The encryption key is not stored in the world state, a group block nor in a smart contract. The current group ID is updated in the world state as a new group is formed. When a group is modified (i.e. members leave, members join), the new members will not be able to decrypt old transactions but the current state of the smart contracts will remain in the same state as before, and the encryption key will change. When a new group is formed, the latest block is not modified, a new block is added that is the 'group block'. The new 'genesis' block that is created may include the hash of the current world state, so new members are still able to validate the initial state of the smart contracts. A few specific parameters may include a group genesis blockchain block, which is a new block that is added to the blockchain when changes in the organization membership take place. This genesis group block may be added to the chain of blocks. Another parameter may include a current group ID, which is the ID of the current group and the active group, and which is added to the world state. Another parameter may include a group encryption key as a new key that is distributed to the members of the new group in an off-chain manner not to be recorded in the blockchain. Still another parameter is a world state hash, which is the hash of the world state at the time of the new group creation, and which is included as metadata in the group genesis block.

Figure 2A:
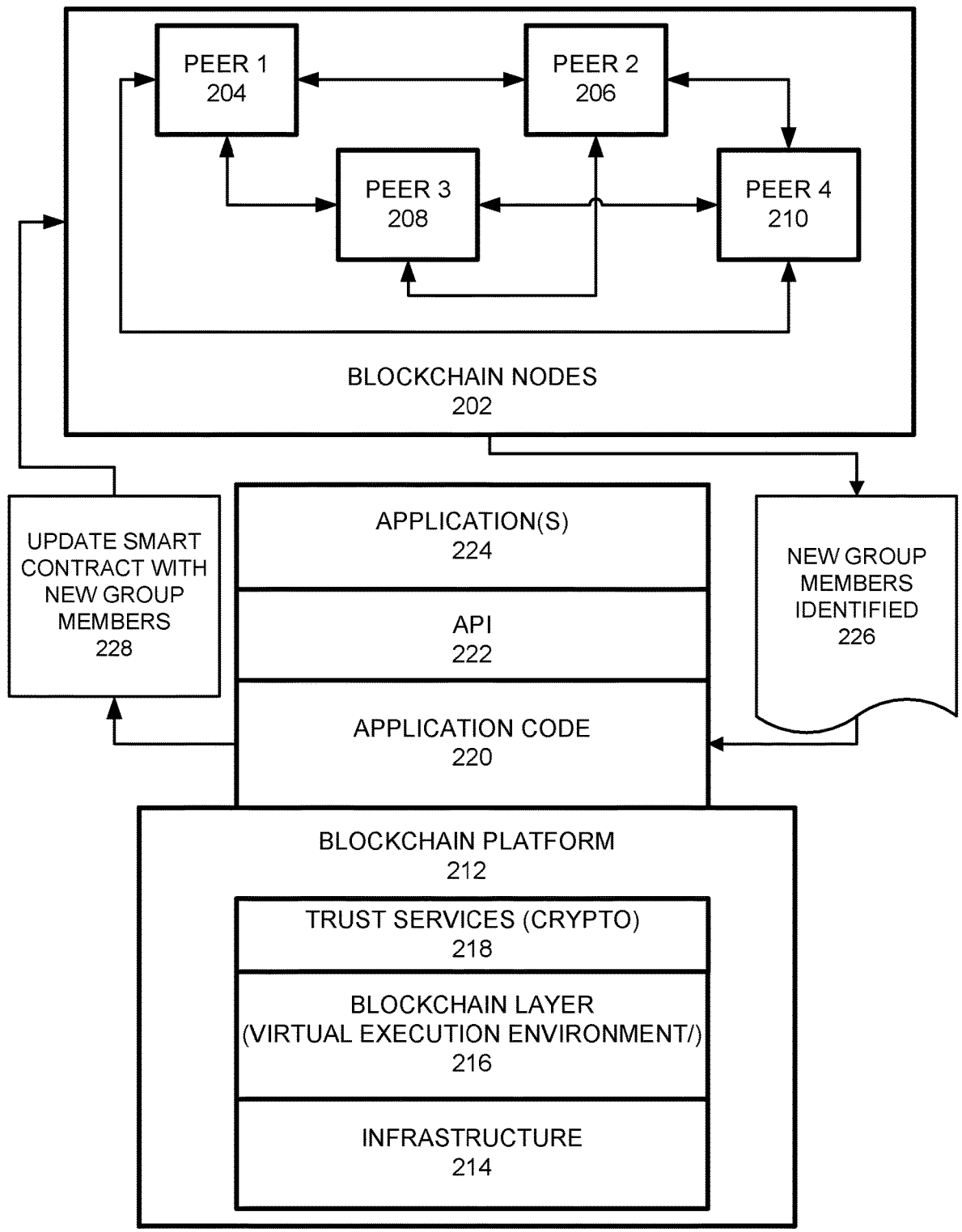
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain entry addition and validation process (consensus). One or more of the blockchain nodes 204-210 may endorse entries based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as an entry and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new entries and provide access to auditors which are seeking to access data entries. The blockchain layer 216 may expose an interface that provides access to the virtual execution environment necessary to process the program code and engage the physical infrastructure 214. Cryptographic trust services 218 may be used to verify entries such as asset exchange entries and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new group member(s) being identified 226, which may be processed by one or more processing entities (e.g., virtual machines) included in the blockchain layer 216. The result 228 may include a decision to update the smart contract and other information sources with the new group member information. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
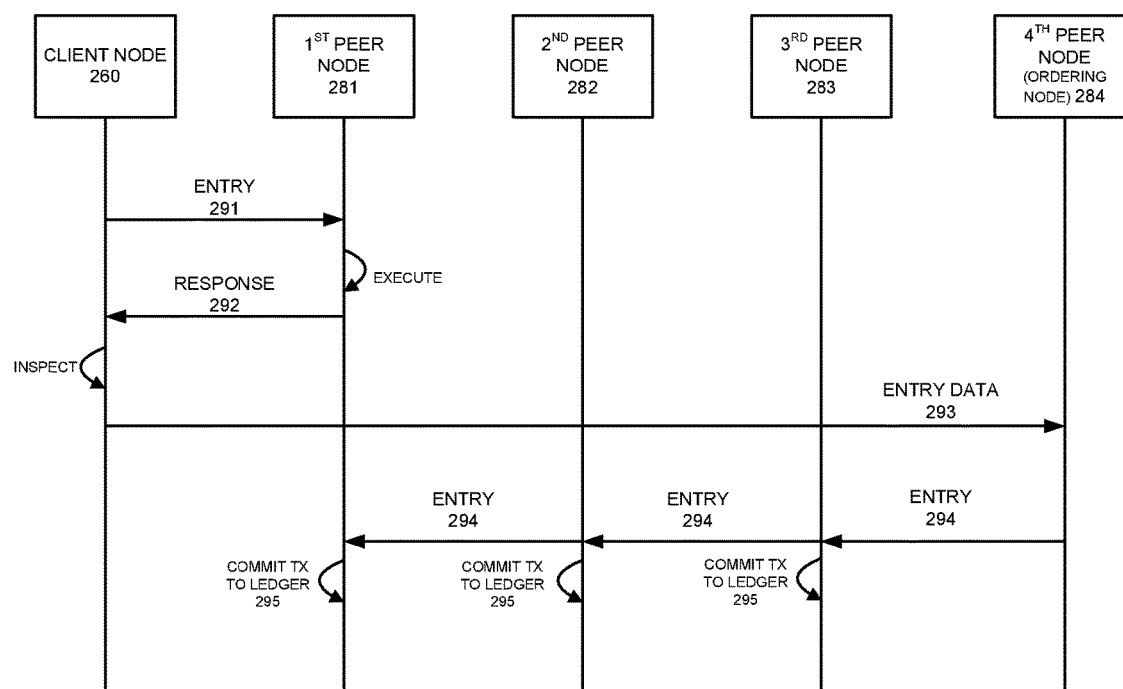
FIG. 2B illustrates a further peer node configuration, according to example embodiments.

FIG. 2B illustrates an example of a flow 250 between nodes of the blockchain in accordance with an example embodiment. Referring to FIG. 2B, the entry flow may include an entry proposal 291 sent by an application client node 260 to an endorsing peer node 281. The endorsing peer 281 may verify the client signature and execute a chaincode function to initiate the entry. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into an entry payload 293 and broadcasts it to an ordering service node 284. The ordering service node 284 then delivers ordered entries as blocks to all peers 281-283 on a channel. Before committal to the blockchain, each peer 281-283 may validate the entry. For example, the peers may check the endorsement policy to ensure that the correct allotment of the specified peers have signed the results and authenticated the signatures against the entry payload 293.

Referring again to FIG. 2B, the client node 260 initiates the entry 291 by constructing and sending a request to the peer node 281, which is an endorser. The client 260 may include an application leveraging a supported software development kit (SDK), such as NODE, JAVA, PYTHON, and the like, which utilizes an available API to generate an entry proposal. The proposal is a request to invoke a chaincode function so that data can be read and/or written to the ledger (i.e., write new key value pairs for the assets). The SDK may serve as a shim to package the entry proposal into a properly architected format (e.g., protocol buffer over a remote procedure call (RPC)) and take the client's cryptographic credentials to produce a unique signature for the entry proposal.

In response, the endorsing peer node 281 may verify (a) that the entry proposal is well formed, (b) the entry has not been submitted already in the past (replay-attack protection), (c) the signature is valid, and (d) that the submitter (client 260, in the example) is properly authorized to perform the proposed operation on that channel. The endorsing peer node 281 may take the entry proposal inputs as arguments to the invoked chaincode function. The chaincode is then executed against a current state database to produce entry results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the entry to the ordering node service 284. If the client application intends to submit the entry to the ordering node service 284 to update the ledger, the application determines if the specified endorsement policy has been fulfilled before submitting (i.e., did all peer nodes necessary for the entry endorse the entry). Here, the client may include only one of multiple parties to the entry. In this case, each client may have their own endorsing node, and each endorsing node will need to endorse the entry. The architecture is such that even if an application selects not to inspect responses or otherwise forwards an unendorsed entry, the endorsement policy will still be enforced by peers and upheld at the commit validation phase.

After successful inspection, in step 293 the client 260 assembles endorsements into an entry and broadcasts the entry proposal and response within an entry message to the ordering node 284. The entry may contain the read/write sets, the endorsing peers signatures and a channel ID. The ordering node 284 does not need to inspect the entire content of an entry in order to perform its operation, instead the ordering node 284 may simply receive entries from all channels in the network, order them chronologically by channel, and create blocks of entries per channel.

The blocks of the entry are delivered from the ordering node 284 to all peer nodes 281-283 on the channel. The entries 294 within the block are validated to ensure any endorsement policy is fulfilled and to ensure that there have been no changes to ledger state for read set variables since the read set was generated by the entry execution. Entries in the block are tagged as being valid or invalid. Furthermore, in step 295 each peer node 281-283 appends the block to the channel's chain, and for each valid entry the write sets are committed to current state database. An event is emitted, to notify the client application that the entry (invocation) has been immutably appended to the chain, as well as to notify whether the entry was validated or invalidated.

Figure 3:
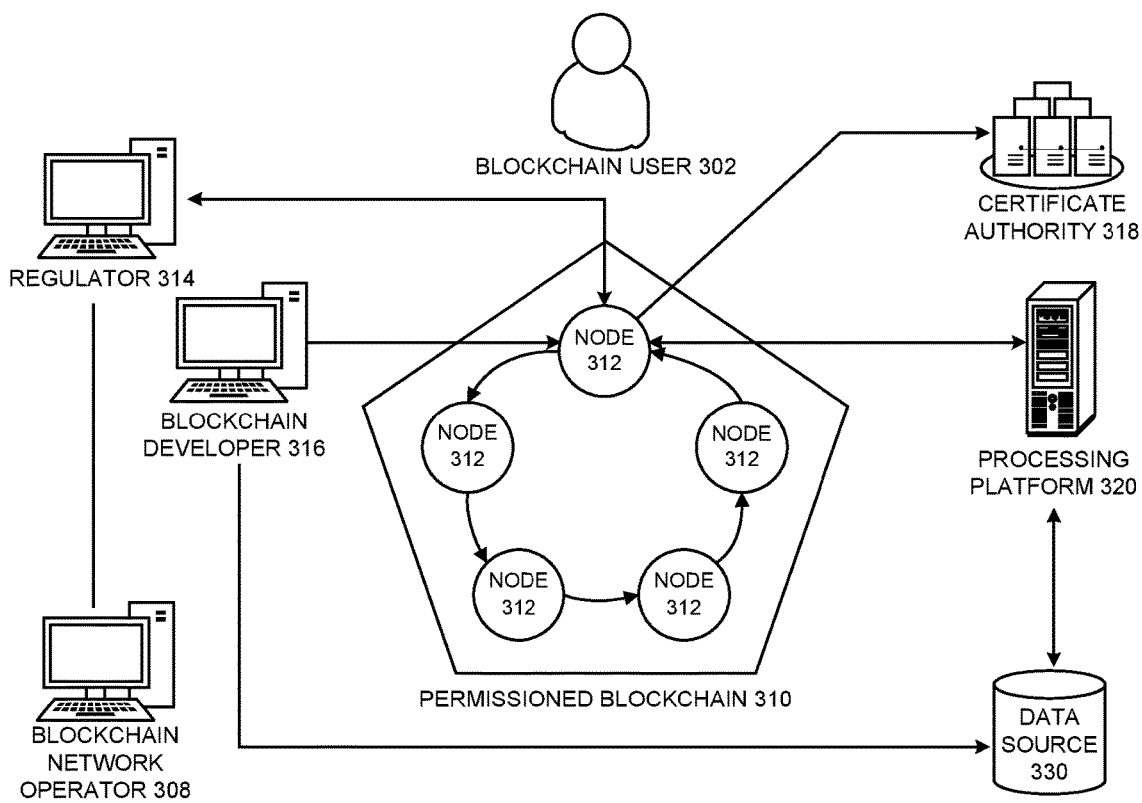
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit an entry to the permissioned blockchain network 310. In this example, the entry can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any entries, the peer node 312 retrieves the user's enrollment and entry certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
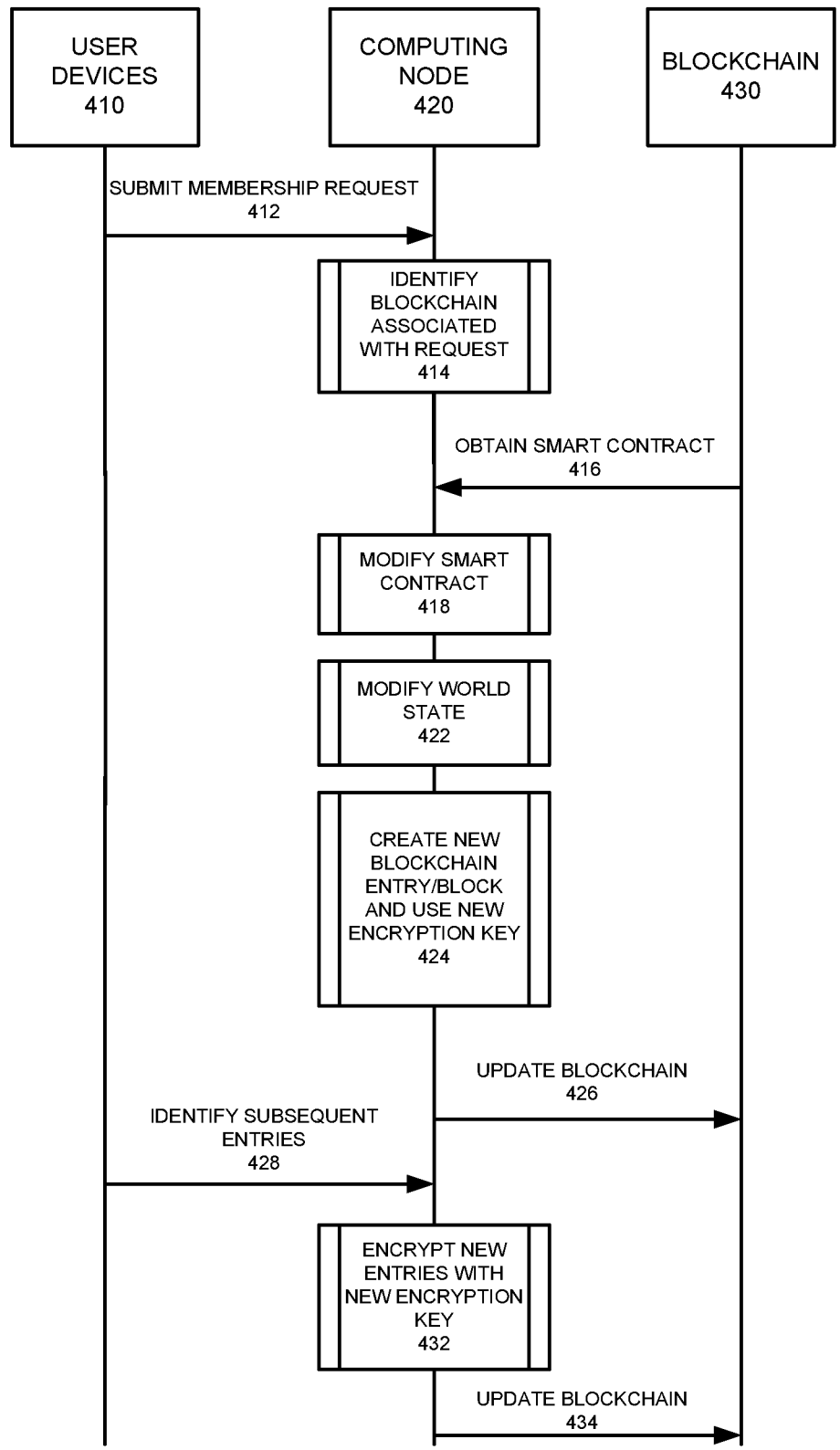
FIG. 4 illustrates a system messaging diagram of a database membership management configuration, according to example embodiments.

FIG. 4 illustrates a system messaging diagram for performing membership management in a database, according to example embodiments. Referring to FIG. 4, the system diagram 400 includes various end users and their devices 410 which represent the parties seeking membership and access to the blockchain. A computing node 420, is a processing node, server, virtual machine or other computing entity that executes the chaincode and performs certain operations in accordance with the blockchain configuration, and the blockchain 430 is where the information is stored and new entries are committed. The user devices 410 may submit a membership request 412 or other initial membership message to the computing node 420 for processing. The computing node 420 then identifies the request 414, the blockchain 430 and retrieves any smart contract 416 created to manage such memberships. The smart contract is modified 418 to reflect the new membership changes. The world state is modified 422 to reflect the new encryption keys to be used for subsequent entries. A new blockchain entry is submitted to a block using the updated key(s) 424. The blockchain is updated 426 and any subsequent entries 428 are received and processed with the new key 432, and all updates are submitted to the blockchain 434.

Figure 5A:
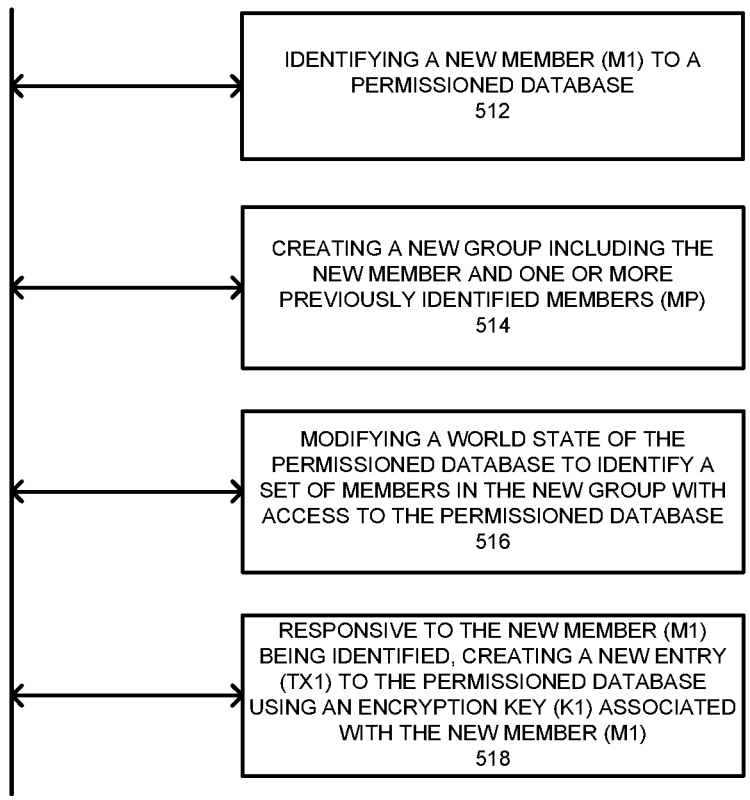
FIG. 5A illustrates a flow diagram of a database membership management configuration, according to example embodiments.

FIG. 5A illustrates a flow diagram 500 of an example method of fraud management in a permissioned database, such as a blockchain, according to example embodiments. Referring to FIG. 5A, the method 500 may include identifying a new member (M1) to the permissioned database 512, creating a new group including the new member and one or more previously identified members (MP) 514, modifying a world state of the permissioned database to identify a set of members in the new group with access to the permissioned database 516, and responsive to the new member (M1) being identified, creating a new entry (TX1) to the permissioned database using an encryption key (K1) associated with the new member (M1) 518.

The method may also include, in an example where the permissioned database is a blockchain, identifying a subsequent entry (TX2) submitted by an existing member of the one or more previously identified blockchain members (MP), encrypting the subsequent blockchain entry (TX2) by the encryption key (K1) associated with the new member, identifying another new member to the blockchain (M2), and the another new member (M2) does not have access to the new blockchain entry (TX1), the subsequent blockchain entry (TX2), and the encryption key (K1). The method may also provide identifying a new blockchain entry (TX3) initiated by the another new member (M2), and encrypting the new blockchain entry by a new encryption key (K2) associated with the another new member. All current blockchain members (MP, M1 and M2) have access to the new blockchain entry. The method may also include determining the new member (M1) has exited the blockchain, and creating another group including the previously identified blockchain members (MP) and the another new member (M2). The method may also include identifying a further blockchain transaction (TX4) submitted via one of the previously identified blockchain members (MP) or the another new member (M2), and encrypting the further blockchain transaction via a further encryption key (K3) associated with only the previously identified blockchain members (MP) and the another new member (M2), and the new member (M1) cannot access the further blockchain transaction.

Figure 5B:
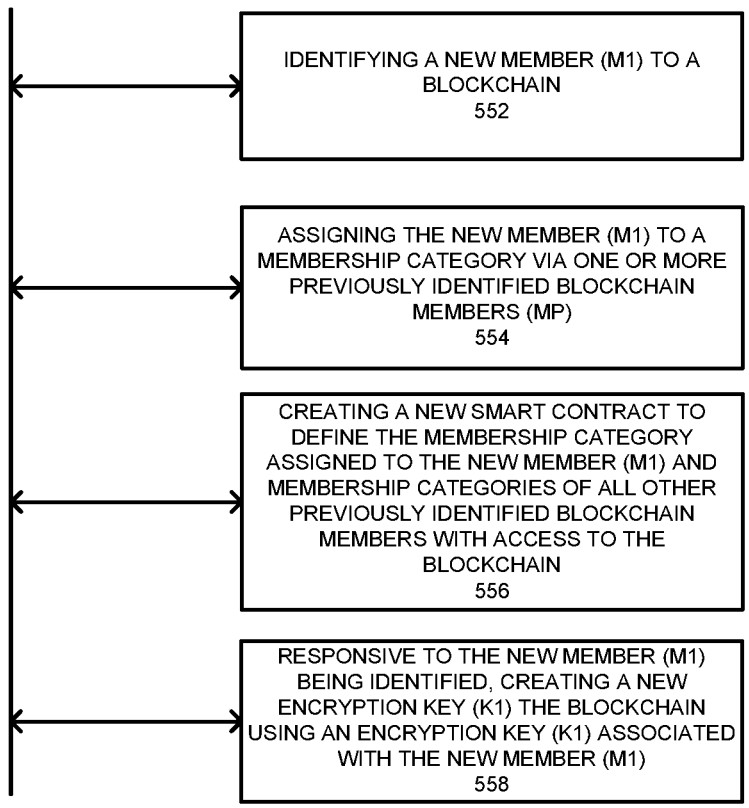
FIG. 5B illustrates a further flow diagram of a database membership management configuration, according to example embodiments.

FIG. 5B illustrates a flow diagram 550 of an example method of in a blockchain, according to example embodiments. The method may include identifying a new member (M1) to a blockchain 552, assigning the new member to a membership category via one or more previously identified blockchain members (MP) 554, creating a new smart contract to define the membership category assigned to the new member and membership categories of all other previously identified blockchain members with access to the blockchain 556, and responsive to the new member (M1) being identified, creating a new encryption key (K1) associated with the new member (M1) 558.

In addition to creating a new group based on changes in membership, the rights specifically assigned to the new member may be identified as limited rights by one or more senior member nodes (i.e., peer nodes). A smart contract is created to identify all active member rights including the new member with limited rights. The encryption key assigned to the new member may be different from a master key used by the peer nodes depending on the new member's rights. The new member may have limited access while being an active member of the group.

Figure 6A:
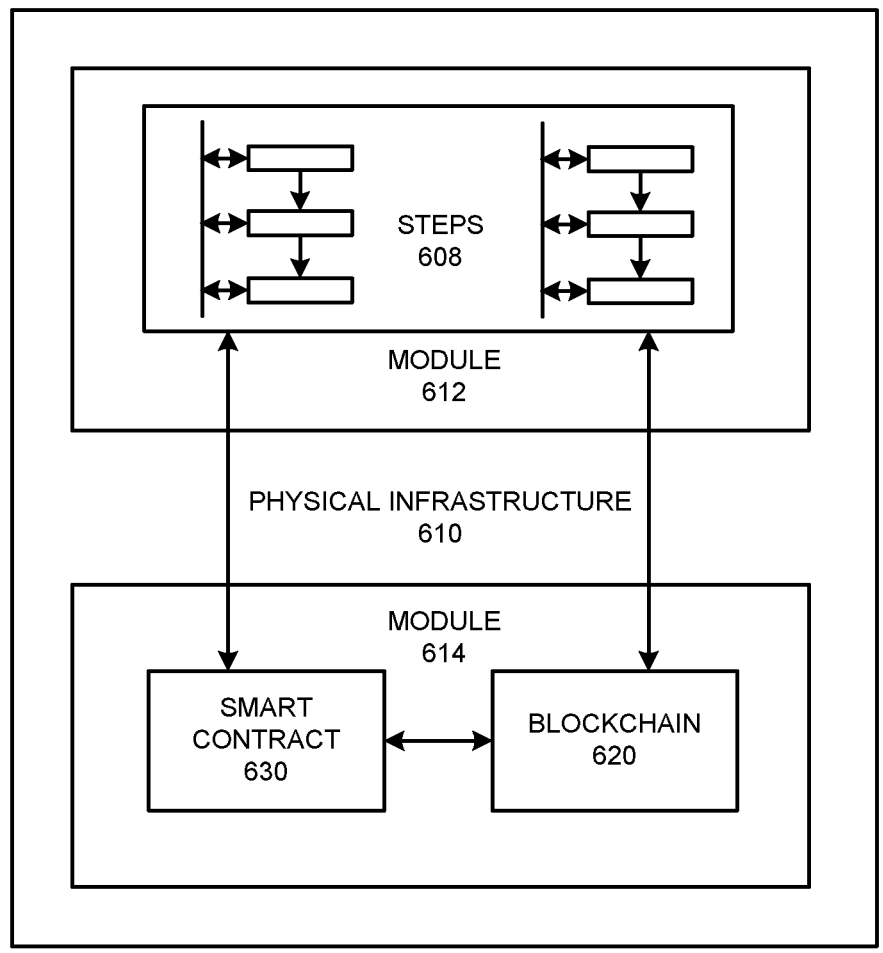
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
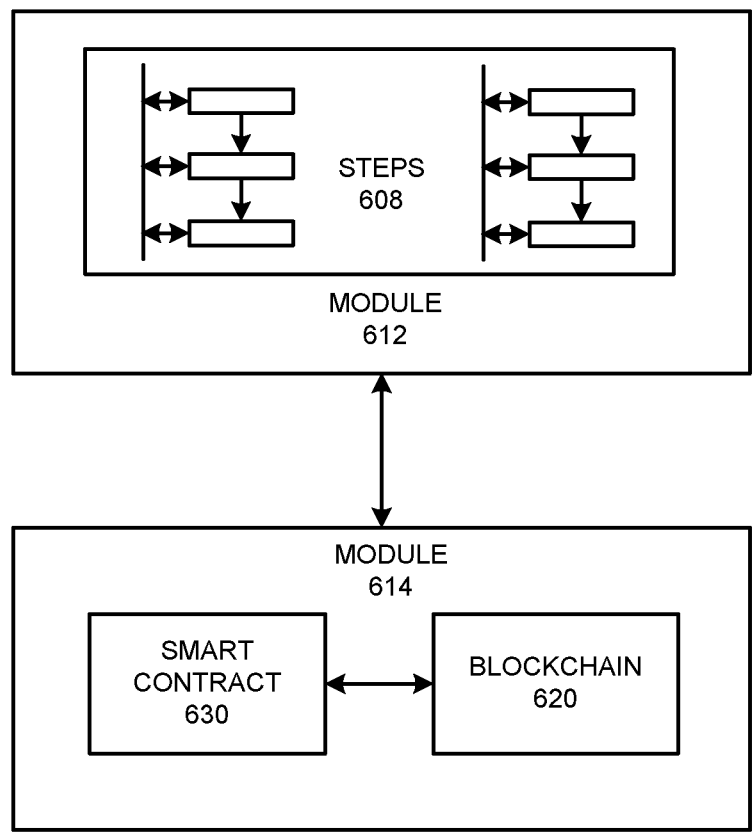
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
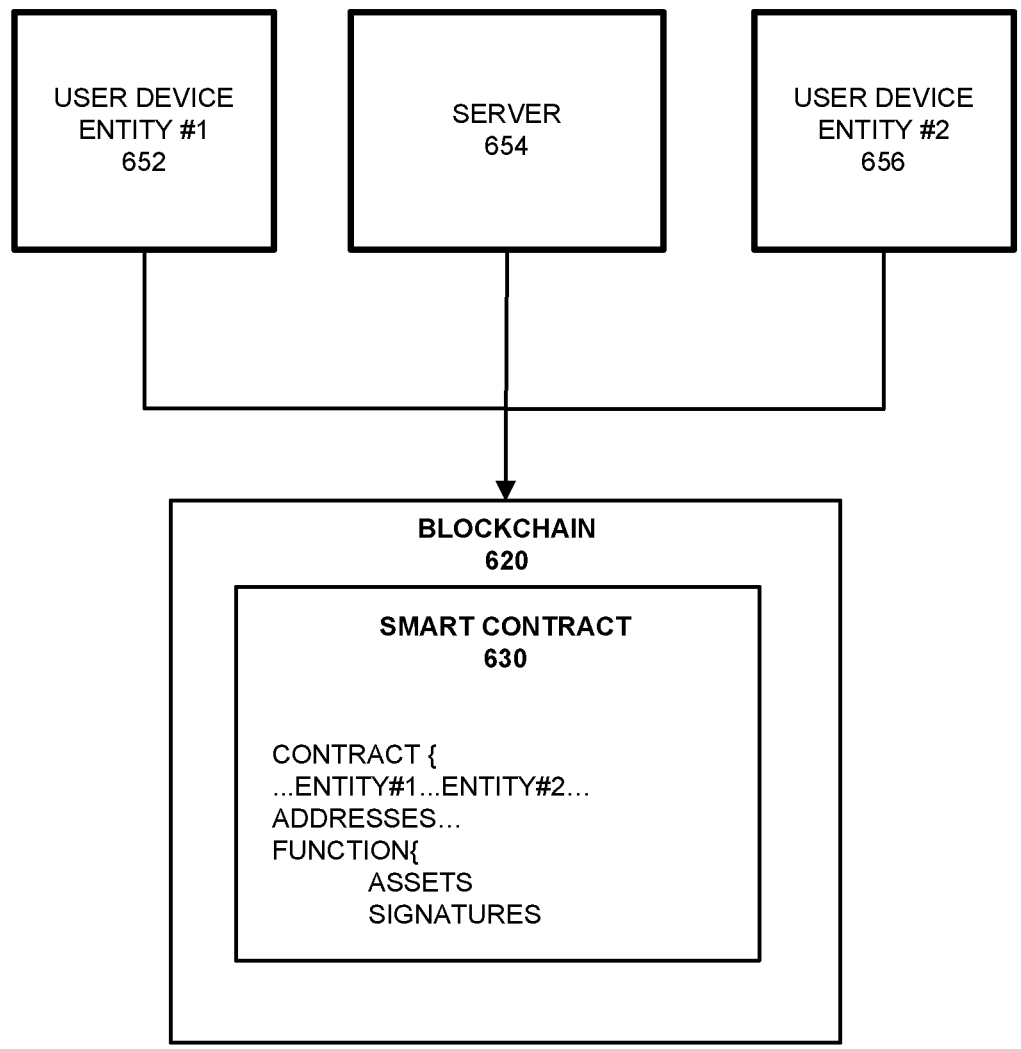
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract entry. The results of the smart contract execution may be written to a blockchain 620 as a blockchain entry. The smart contract 630 resides on the blockchain 620 which may reside on one or more computers, servers, processors, memories, and/or wireless communication devices.

Figure 6D:
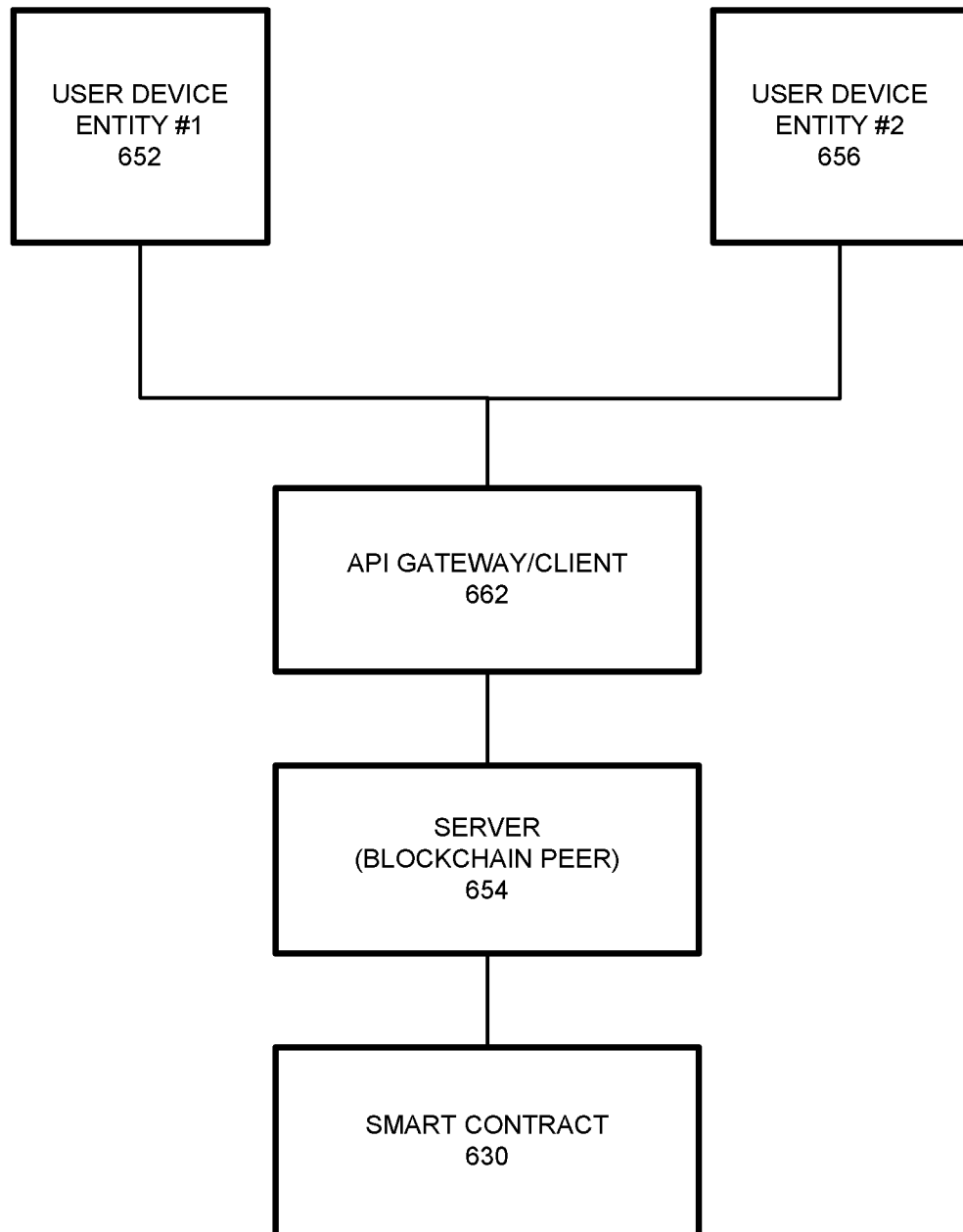
FIG. 6D illustrates another an additional example system, according to example embodiments.

FIG. 6D illustrates a common interface 660 for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing entries (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit entries into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7A:
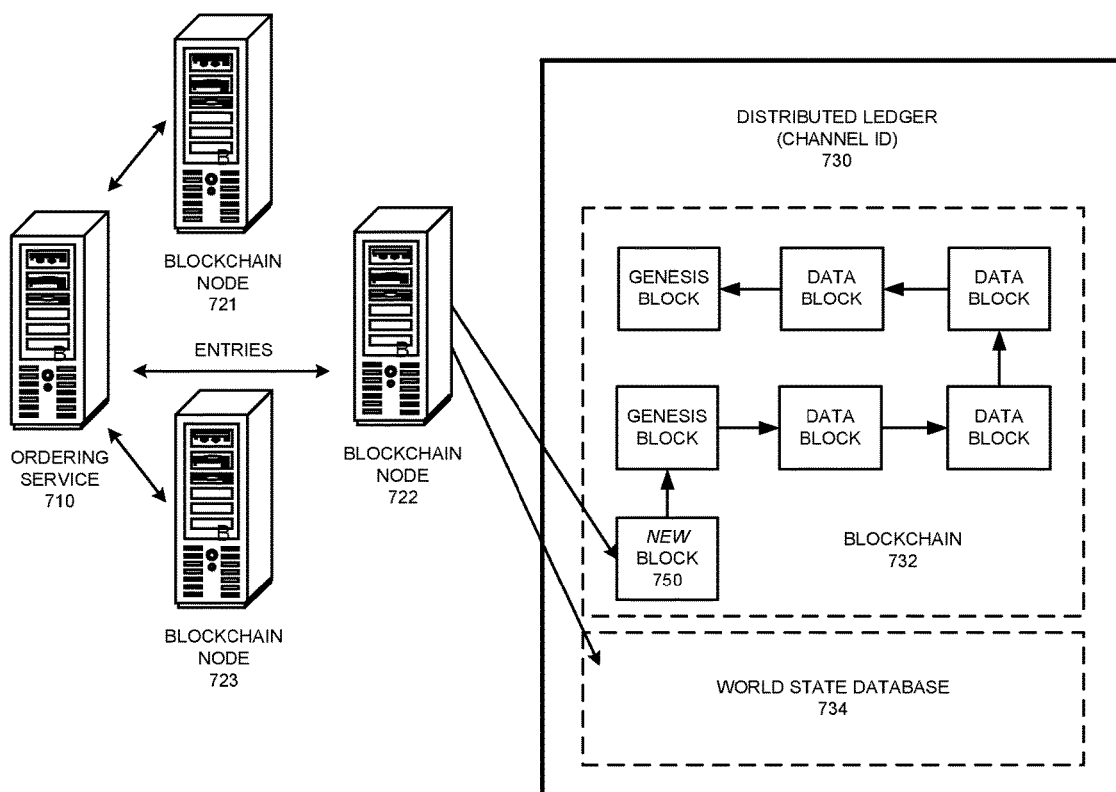
FIG. 7A illustrates a process of new data being added to a database, according to example embodiments.
Figure 7B:
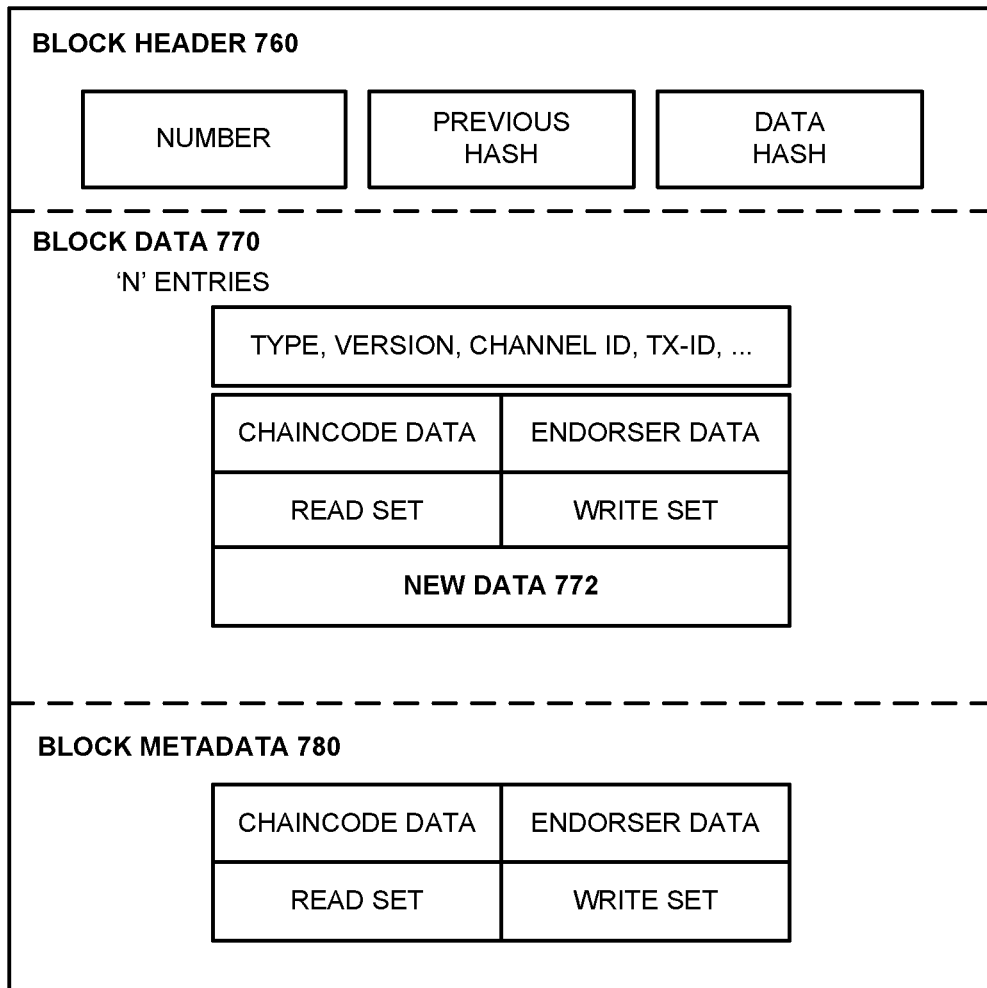
FIG. 7B illustrates contents of a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit entries to blockchain nodes 721, 722, and/or 723. Clients may be instructions received from any source to enact activity on the blockchain 730. As an example, clients may be applications that act on behalf of a requester, such as a device, person or entity to propose entries for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse entries proposed by clients and committing peers which verify endorsements, validate entries, and commit entries to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is an entry log, structured as hash-linked blocks where each block contains a sequence of N entries. Blocks may include various components such as shown in FIG. 7B. The linking of the blocks (shown by arrows in FIG. 7A) may be generated by adding a hash of a prior block's header within a block header of a current block. In this way, all entries on the blockchain 732 are sequenced and cryptographically linked together preventing tampering with blockchain data without breaking the hash links. Furthermore, because of the links, the latest block in the blockchain 732 represents every entry that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain entry log of the blockchain 732. Chaincode invocations execute entries against the current state in the state database 734. To make these chaincode interactions extremely efficient, the latest values of all keys are stored in the state database 734. The state database 734 may include an indexed view into the entry log of the blockchain 732, it can therefore be regenerated from the chain at any time. The state database 734 may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry. The method of endorsing an entry depends on an endorsement policy which may be specified within chaincode. An example of an endorsement policy is "the majority of endorsing peers must endorse the entry." Different channels may have different endorsement policies. Endorsed entries are forward by the client application to ordering service 710.

The ordering service 710 accepts endorsed entries, orders them into a block, and delivers the blocks to the committing peers. For example, the ordering service 710 may initiate a new block when a threshold of entries has been reached, a timer times out, or another condition. In the example of FIG.

7A, blockchain node 722 is a committing peer that has received a new data block 750 for storage on blockchain 730.

The ordering service 710 may be made up of a cluster of orderers. The ordering service 710 does not process entries, smart contracts, or maintain the shared ledger. Rather, the ordering service 710 may accept the endorsed entries and specifies the order in which those entries are committed to the distributed ledger 730. The architecture of the blockchain network may be designed such that the specific implementation of 'ordering' (e.g., Solo, Kafka, BFT, etc.) becomes a pluggable component.

Entries are written to the distributed ledger 730 in a consistent order. The order of entries is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the entry within the new block 750 by checking to make sure that the read set and the write set still match the current world state in the state database 734. Specifically, the committing peer can determine whether the read data that existed when the endorsers simulated the entry is identical to the current world state in the state database 734. When the committing peer validates the entry, the entry is written to the blockchain 732 on the distributed ledger 730, and the state database 734 is updated with the write data from the read-write set. If an entry fails, that is, if the committing peer finds that the read-write set does not match the current world state in the state database 734, the entry ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores entry data, however this is not a requirement. The block 750 may store transactional information of N entries (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store entry information of each entry that is recorded within the block 750. For example, the entry data may include one or more of a type of the entry, a version, a timestamp, a channel ID of the distributed ledger 730, an entry ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 770 may also store data 772 which adds additional information to the hash-linked chain of blocks in the blockchain 732. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The entry filter may include a byte array of a size equal to the number of entries in the block data 770 and a validation code identifying whether an entry was valid/invalid.

Figure 8:
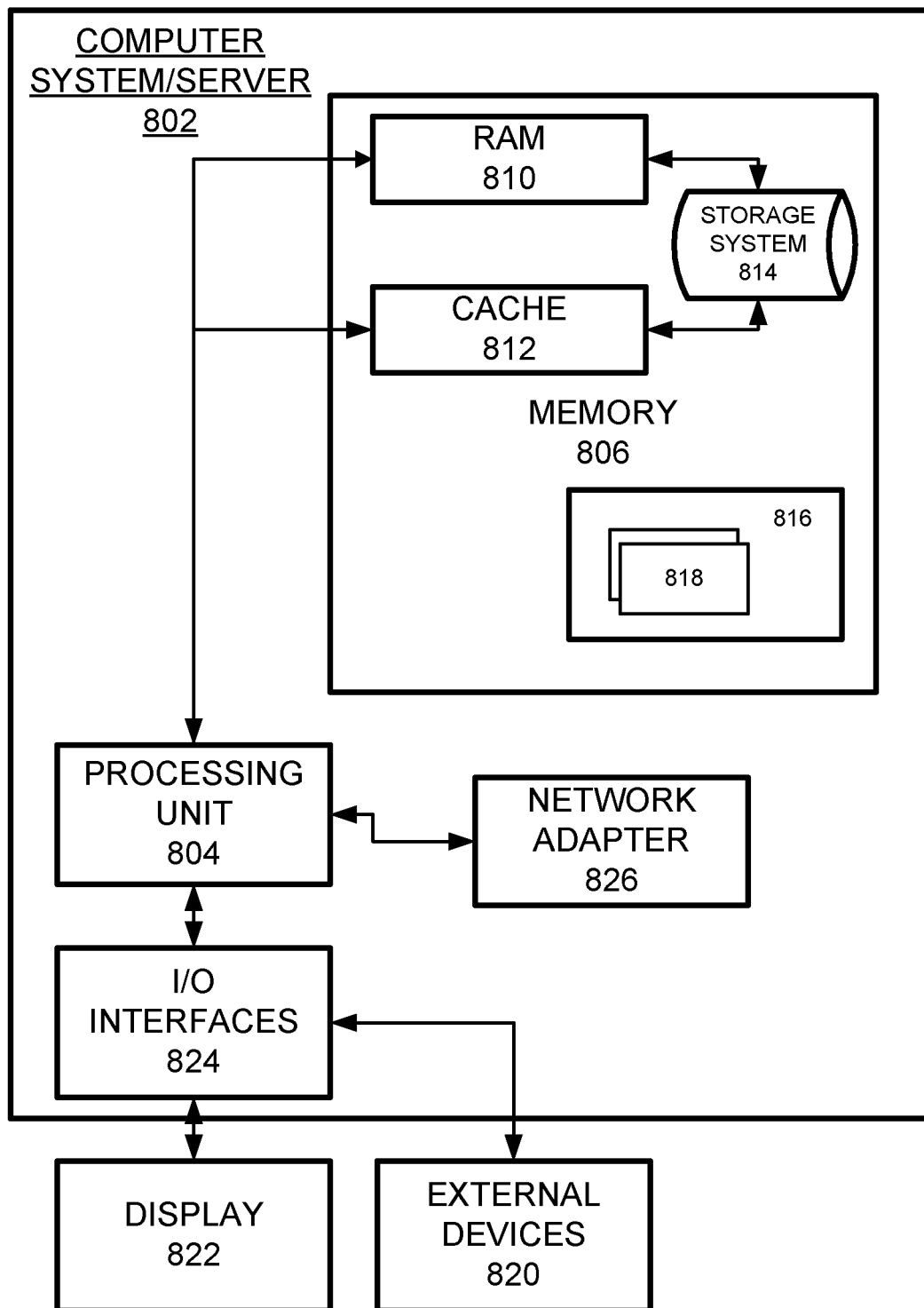
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
    a permissioned blockchain managed by a group of member devices which use an existing encryption key to encrypt data stored to the permissioned blockchain;
    a state database implemented within a ledger of the permissioned blockchain and storing current values of keys of the permissioned blockchain; and
    a computing node configured to
        create a modified group of member devices including a new member device and one or more existing member devices included in the group of member devices;
        in response to creating the modified group of member devices, distribute a new encryption key to member devices of the modified group of member devices to replace the existing encryption key when storing data to the permissioned blockchain; and
        store a new block to the permissioned blockchain which includes a hash of a state of the state database, where the hashed state of the state database comprises a state of the state database prior to the creation of the modified group of member devices, and encrypting the new block using the new encryption key.

2. The system of claim 1, wherein the computing node is further configured to identify a subsequent blockchain entry submitted by a member device of the one or more existing member devices included in the modified group of member devices and encrypt the subsequent blockchain entry by the new encryption key associated with the modified group of member devices.

3. The system of claim 1, wherein the computing node is further configured to identify another new member device, wherein the another new member device does not have access to the new encryption key.

4. The system of claim 3, wherein the computing node is further configured to identify another new blockchain entry initiated by the another new member device and encrypt the another new blockchain entry by another new encryption key associated with the another new member device.

5. The system of claim 1, wherein the computing node is further configured to determine the new member device has exited the modified group of member devices and create another modified group of member devices including remaining member devices in the modified group without the new member device.

6. The system of claim 1, wherein the computing node is further configured to store the new encryption key within a smart contract of the permissioned blockchain.

7. A method, comprising:
    storing entries to a permissioned blockchain managed by a group of member devices which use an existing encryption key to encrypt data stored to the permissioned blockchain;
    storing, via a state database implemented within a ledger of the permissioned blockchain, current values of keys of the permissioned blockchain;
    creating a modified group of member devices including a new member device and one or more existing member devices included in the group of member devices;
    in response to creating the modified group of member devices, distributing a new encryption key to member devices of the modified group of member devices to replace the existing encryption key when storing data to the permissioned blockchain; and
    storing a new block to the permissioned blockchain which includes a hash of a state of the state database, where the hashed state of the state database comprises a state of the state database prior to creation of the modified group of member devices, and encrypting the new block using the new encryption key.

8. The method of claim 7, further comprising:
    identifying a subsequent blockchain entry submitted by a member device of the one or more existing member devices included in the modified group of member devices; and
    encrypting the subsequent blockchain entry by the new encryption key associated with the modified group of member devices.

9. The method of claim 7, further comprising:
    identifying another new member device, wherein the another new member device does not have access to the new encryption key.

10. The method of claim 9, further comprising:
    identifying another new blockchain entry initiated by the another new member device; and
    encrypting the another new blockchain entry by another new encryption key associated with the another new member device.

11. The method of claim 7, further comprising:
  determining the new member device has exited the new group; and
  creating another modified group of member devices including remaining member devices in the modified group without the new member device.

12. The method of claim 7, further comprising storing the new encryption key within a smart contract of the permissioned blockchain.

13. A non-transitory computer readable storage medium configured to store instructions that when executed cause a processor to perform:
  storing entries to a permissioned blockchain managed by a group of member devices which use an existing encryption key to encrypt data stored to the permissioned blockchain;
  storing, via a state database implemented within a ledger of the permissioned blockchain, current values of keys of the permissioned blockchain;
  creating a modified group of member devices including a new member device and one or more existing member devices included in the group of member devices;
  in response to creating the modified group of member devices, distributing a new encryption key to member devices of the modified group of member devices to replace the existing encryption key when storing data to the permissioned blockchain; and
  storing a new block to the permissioned blockchain which includes a hash of a state of the state database, where the hashed state of the state database comprises a state of the state database prior to creation of the modified group of member devices, and encrypting the new block using the new encryption key.

14. The non-transitory computer readable storage medium of claim 13, wherein the processor is further configured to perform:
  identifying a subsequent blockchain entry submitted by a member device of the one or more existing member devices in the modified group of member devices; and
  encrypting the subsequent blockchain entry by the new encryption key associated with the modified group of member devices.

15. The non-transitory computer readable storage medium of claim 13, wherein the processor is further configured to perform:
  identifying another new member device, wherein the another new member device does not have access to the new encryption key.

16. The non-transitory computer readable storage medium of claim 15, wherein the processor is further configured to perform:
  identifying another new blockchain entry initiated by the another new member device; and
  encrypting the another new blockchain entry by another new encryption key associated with the another new member device.

17. The non-transitory computer readable storage medium of claim 13, wherein the processor is further configured to perform:
  determining the new member device has exited the new group; and
  creating another modified group of member devices including remaining member devices in the modified group without the new member device.

* * * * *